J. M. FRAZER.
WHEEL TIRE MARKING TOOL.
APPLICATION FILED DEC. 6, 1913.
1,143,821.
Patented June 22, 1915.
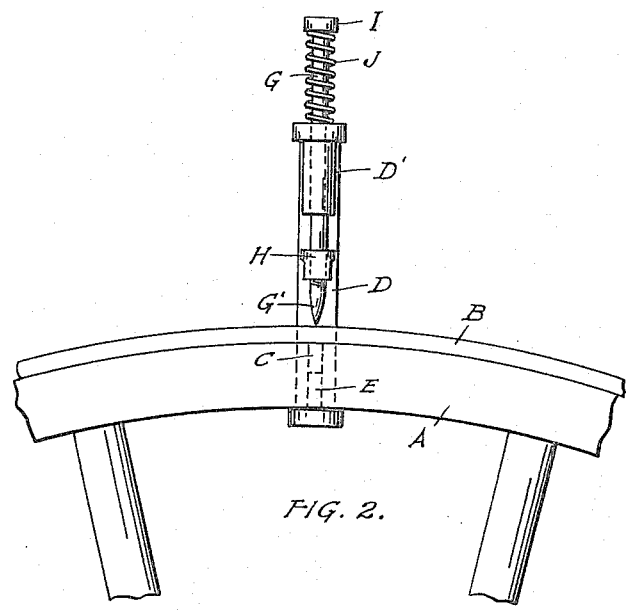
FIG. 2.
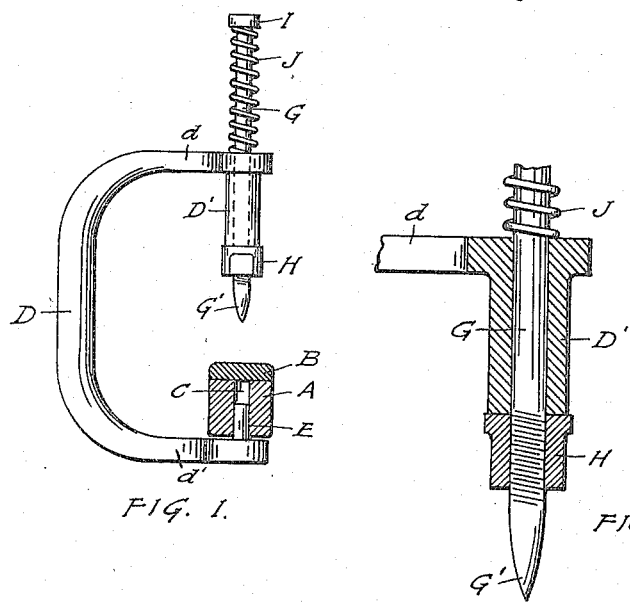
FIG. 1.
FIG. 3.
WITNESSES:
A. B. Cornefure
Marie Mitchell.
INVENTOR:
James M. Frazer
BY Eugene Ayres,
ATTORNEY.
THE NORRIS PETERS CO., PHOTO-LITHO., WASHINGTON, D. C.

UNITED STATES PATENT OFFICE.

JAMES M. FRAZER, OF WESTON, MISSOURI.

WHEEL-TIRE-MARKING TOOL.

1,143,821.  Specification of Letters Patent.  Patented June 22, 1915.

Application filed December 6, 1913. Serial No. 805,034.

*To all whom it may concern:*

Be it known that I, JAMES M. FRAZER, a citizen of the United States of America, residing at Weston, in the county of Platte and State of Missouri, have invented certain new and useful Improvements in Wheel-Tire-Marking Tools, of which the following is a specification.

The object of my invention is to provide a device by which in setting wagon or carriage tires the alinement of the perforation in the tire can be regulated so that it will be exact with the perforation in the wooden rim of the wheel.

I accomplish my object by the construction of the tool shown in the accompanying drawings, in which, Figure 1 is an elevation of the device shown inserted in the wooden rim of a wheel (in section) in position ready for marking the tire; Fig. 2 is an elevation of the same showing the tool in engagement with the tire in marking position, and Fig. 3 is an enlarged sectional detail view of the holding sleeve and punch of the device.

Similar letters refer to corresponding parts in said drawings and throughout the specification, A representing a section of an ordinary wooden rim and B a tire in position on said rim. C is a hole pierced or bored through said rim to receive a bolt that will pass through both rim and tire to retain them rigidly together.

D is the handle of the tool having lateral ends $d$ and $d'$ of equal length its lower lateral end being provided with a screw bolt E on which hole C fits thereby holding the rim securely in position until the tire has received a mark or punch in exact alinement with said hole C. The upper lateral end of said handle is provided with a circular opening and a downwardly projected holding sleeve D' through which a rod G is adapted to travel. The bottom end of said rod tapers to a point forming a punch G' to enable it to mark or indent the tire. Just above said punch the rod is threaded and a threaded thimble H is adapted to be screwed thereon. Said rod has a flat head I with a slightly extended horizontal flange. A spiral spring J on said rod is seated at the top of the upper lateral end $d$ of the handle around the opening therein and is held in position at the top by said rod head flange. Said thimble H serves as a buffer against the bottom of said downwardly projected sleeve D' preventing the rod being carried up by the spiral spring above the position shown in Fig. 1 of the drawings. Said thimble being threaded permits it to be screwed down and off the punch end of the rod to permit the rod and spring to be removed from the handle of the tool for repairs, for sharpening the punch, or other purpose.

The tool is usually operated by the blows of a hammer dealt by a blacksmith on the flat head of the rod the spiral spring carrying said rod up automatically after each stroke has driven it down.

What I claim and desire to secure by Letters Patent, is:

1. In a wheel tire marking tool the combination with a curved handle having corresponding flattened ends in vertical alinement, of a rod having a punch end, a thread immediately above said punch end, and a thimble to engage said thread, a holding sleeve extending vertically below the upper lateral end of the handle, a flange on the top of said rod, and a spiral spring on said rod having its upper end always in engagement with said flange and its lower end always seated on the upper lateral end of said handle.

2. The combination in a wheel tire marking tool having its ends in vertical alinement the upper end having a central circular opening, and a rigidly set holding sleeve extending below said opening, of a straight vertical rod having a tapering marking point at the bottom, a threaded portion above said taper point, a threaded thimble serving as a buffer on said rod against the bottom of said sleeve adjustable off and on said rod, and a flat flanged head and a spiral spring seated on said rod at the top of said circular opening and always in engagement with the bottom of said flanged head.

3. In a wheel tire marking tool the combination with a curved handle its ends always in vertical alinement the lower end having a wheel rim and tire holding bolt and the upper end a downwardly projecting holding sleeve, of a rod having a tapered and threaded lower end and a flanged head, and an unhoused spiral spring on said rod between its flanged head and the upper end of the handle in engagement at its top and bottom only and a thimble on the lower portion of said rod to serve as a buffer.

In testimony whereof I affix my signature in presence of two witnesses.

JAMES M. FRAZER.

Witnesses:
FRANK G. BOWMAN,
JOHN KING.

Copies of this patent may be obtained for five cents each, by addressing the "Commissioner of Patents, Washington, D. C."